United States Patent
Lee et al.

(10) Patent No.: US 11,700,120 B2
(45) Date of Patent: Jul. 11, 2023

(54) PAIRING APPARATUS USING SECRET KEY BASED ON POWER LINE NOISE, METHOD THEREOF

(71) Applicants: Kyuin Lee, Seoul (KR); Younghyun Kim, Anyang-si (KR); Suman Banerjee, Madison, WI (US); Neil Klingensmith, Chicago, IL (US)

(72) Inventors: Kyuin Lee, Seoul (KR); Younghyun Kim, Anyang-si (KR); Suman Banerjee, Madison, WI (US); Neil Klingensmith, Chicago, IL (US)

(*) Notice: Subject to any disclaimer, the term of this patent is extended or adjusted under 35 U.S.C. 154(b) by 196 days.

(21) Appl. No.: 17/217,630

(22) Filed: Mar. 30, 2021

(65) Prior Publication Data
US 2022/0078013 A1   Mar. 10, 2022

(30) Foreign Application Priority Data
Sep. 9, 2020   (KR) .................. 10-2020-0115663

(51) Int. Cl.
*H04L 9/08* (2006.01)
*H04L 9/12* (2006.01)
*H04L 9/32* (2006.01)

(52) U.S. Cl.
CPC .............. *H04L 9/32* (2013.01); *H04L 9/0861* (2013.01); *H04L 9/12* (2013.01)

(58) Field of Classification Search
CPC . H04L 9/32; H04L 9/0861; H04L 9/12; H04L 2209/08; H04L 2209/34; H04B 3/56
See application file for complete search history.

(56) References Cited

U.S. PATENT DOCUMENTS

2019/0312728 A1*  10/2019  Poeppelmann ....... H04L 9/3093
2020/0036518 A1*   1/2020  Oda ..................... H04L 9/0656
2022/0103375 A1*   3/2022  El Kaafarani ........... H04L 9/14

OTHER PUBLICATIONS

X. Zhu, F. Xu, E. Novak, C. C. Tan, Q. Li and G. Chen, "Using Wireless Link Dynamics to Extracts Secret Key in Vehicular Scenarios," in IEEE Transactions on Mobile Computing, vol. 16, No. 7, pp. 2065-2078, Jul. 1, 2017, doi: 10.1109/TMC.2016.2557784. (Year: 2017).*
Kyuin Lee, Neil Klingensmith, Suman Banerjee and Younghyun Kim, VoltKey: Continuous Secret Key Generation Based on Power Line Noise for Zero-Involvement Pairing and Authentication, Sep. 2019, 26 pages.
Kyuin Lee, Neil Klingensmith, Suman Banerjee and Younghyun Kim, VoltKey: Continuous Secret Key Generation Based on Power Line Noise for Zero-Involvement Pairing and Authentication, Sep. 13, 2019, 25 pages.

* cited by examiner

*Primary Examiner* — Michael Simitoski
*Assistant Examiner* — Hany S. Gadalla
(74) *Attorney, Agent, or Firm* — Stetina Brunda Garred and Brucker

(57) ABSTRACT

A pairing apparatus according to an exemplary embodiment of the present invention includes: a noise filtering part for filtering a noise on a power line; and a processor for pairing with a pairing target device and performing an authentication by generating a secret key using the filtered noise and by using the generated secret key.

11 Claims, 11 Drawing Sheets

PAIRING APPARATUS USING SECRET KEY BASED ON POWER LINE NOISE, METHOD THEREOF

CROSS-REFERENCE TO RELATED APPLICATIONS

This application claims priority to Korean Patent Application No. 10-2020-0115663 filed on Sep. 9, 2020, the disclosure of which is expressly incorporated herein by reference.

STATEMENT RE: FEDERALLY SPONSORED RESEARCH/DEVELOPMENT

Not Applicable

BACKGROUND

Technical Field

The present invention relates to a pairing apparatus and a method thereof, and more particularly to a pairing apparatus performing a pairing and an authentication by generating a secret key based on power line noise and a pairing method thereof.

Background

Recently, IoT (Internet-of-Things) technology is being developed at a great speed, and the number of connected IoT apparatus (device) is expected to increase on a worldwide scale to about 200 billion by the time of 2020, which means over 20 for each person. However, most of the actually distributed IoT apparatus are concentrated on business, manufacturing and medical fields and personal IoT apparatus are yet to be generalized to the general public. One of the major obstacles for universalization of IoT apparatus is security and usability, where the usability, unlike the business, manufacturing and medical fields employing professional staff teams for distributing and maintaining the large scale IoT systems, is the core of security mechanism relative to personal IoT system distributed, maintained and managed by non-professional users.

In particular, there is a need for technology capable of quickly, safely and easily setting a common security key between a newly-added device and an existing network and safely managing a subsequently established connection. Most of the low-cost IoT devices have substantial difficulties in realizing a key generation safely useable in personal IoT systems, because of delegating a user interface to web or mobile-based IoT application ("IoT app"), largely without recourse to form factor or own on-board interface due to form factor, such that pairing and authentication technologies capable of solving the foregoing problems are required.

BRIEF SUMMARY

The technical subject to be solved by the present invention is to provide a pairing apparatus performing a pairing and an authentication by generating a secret key based on power line noise and a pairing method thereof.
In one exemplary embodiment of the present invention, there is provided a pairing apparatus, comprising:
 a noise filtering part for filtering a noise on a power line; and
 a processor for generating a secret key using the filtered noise and for performing a pairing and an authentication with a pairing target device using the generated secret key.

The noise filtering part may include: a transformer for transforming a voltage of the power line to a first voltage; a filter for attenuating a fundamental frequency band of a signal transformed to the first voltage; and an amplifier for amplifying the signal attenuated in the fundamental frequency band to within a predetermined period.

The amplifier may change a gain of the amplifier in response to an amplitude of the signal attenuated in the fundamental frequency band.

The processor may extract a bit sequence by sampling the filtered noise while generating the secret key through synchronization with the pairing target device and performing the authentication using the secret key.

The processor may sample the filtered noise, synchronize a sampling rate and a sampling time by transmitting the sampling rate to and receiving the sampling rate from the pairing target device, extract a bit sequence by comparing a maximum absolute value and an average value of each period of the sampled noise, transmitting an error correcting code of the extracted bit sequence to and receiving the error correcting code of the extracted bit sequence from the pairing target device, and generate the secret key by reconciling the extracted bit sequence.

In another exemplary embodiment of the present invention, there is provided a pairing method, comprising:
 filtering a noise of a power line;
 generating a secret key by using the filtered noise; and
 performing a pairing and an authentication with a pairing target device using the generated secret key.

The step of filtering the noise of the power line may include:
 transforming a voltage of the power line to a first voltage;
 attenuating a fundamental frequency band of a signal transformed to the first voltage; and
 amplifying the signal attenuated in the fundamental frequency band to within a predetermined period.

The amplifying step may include changing a gain of the amplifier in response to an amplitude of the signal attenuated in the fundamental frequency band.

The step of generating the secret key may include:
 extracting a bit sequence by sampling the filtered noise; and generating the secret key through synchronization with the pairing target device.

The step of generating the secret key may include:
 sampling the filtered noise;
 measuring a sampling rate;
 matching the sampling rate by transmitting the measured sampling rate to and receiving the measured sampling rate from the pairing target device;
 synchronizing the sampling time by transmitting a sample of the sampled noise to and receiving the sample of the sampled noise from the pairing target device;
 extracting a bit sequence from the sampled noise; and
 generating the secret key by transmitting an error correcting code of the extracted bit sequence to and receiving the error correcting code of the extracted bit sequence from the pairing target device, and reconciling the extracted bit sequence.

The step of extracting the bit sequence may include:
 dividing the sampled noise by a predetermined period; and
 extracting the bit sequence by extracting a one (1) bit value when a value having a maximum absolute value for each period is greater than an entire average value of the sampled noise, and extracting a zero (0) bit value when a value having a maximum absolute value for each period is smaller than an entire average value of the sampled noise.

According to the exemplary embodiments of the present invention, security may be increased by using a noise of power line, and pairing and authentication between devices may be enabled without involvement of a user.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Hereinafter, exemplary embodiments of the present invention will be described in detail with reference to the accompanying drawings.

However, the technical ideas of the present invention may not be limited to some of the exemplary embodiments given but may be embodied by mutually different various forms, and may be used by selectively combining or substituting one or more constituent elements among the exemplary embodiments as long as within the technical ideas of the present invention.

Furthermore, unless defined otherwise, all terms (including technical and scientific terms) used herein may have meanings understood by those skilled in the art, and it will be further understood that terms, such as those defined in commonly used dictionaries, should be interpreted as having a meaning that is consistent with their meaning in the context of the relevant art and the present invention.

Furthermore, terms used in the specification are only provided to illustrate the embodiments and should not be construed as limiting the scope and spirit of the present invention. In the specification, a singular form of terms includes plural forms thereof, unless specifically mentioned otherwise, and each of the expressions "at least one of A, B and C (or more than one)" may mean one or more combinations in all the combinations combined by A, B, and C.

Furthermore, in the explanation of elements of the present invention, it will be understood that, although the terms first, second, A, B, (a) and (b), etc. may be used herein to describe various elements, these elements should not be limited by these terms. These terms are only used to distinguish one element from another and, when used herein, do not imply or are not limited by a sequence or order unless clearly indicated by the context.

Furthermore, words such as "connect", "attached" or "coupled to" used in describing a relationship between different elements not only may imply a direct physical connection with other elements but also may include "connected", "attached" or "coupled to" the other elements through intervening elements.

Furthermore, relative terms, such as "lower" or "bottom" and "upper" or "top," may be used herein to describe relationship of one or more elements to other elements as illustrated in the Figures. It will be understood that relative terms are intended to encompass different orientations of the device in addition to the orientation depicted in the figures. For example, if a device in the figures is turned over, elements described as being on the "lower" side of other elements would then be oriented on "upper" sides of the other elements. The exemplary term "lower," can therefore, encompasses both an orientation of "lower" and "upper," depending of the particular orientation of the figure. Similarly, if the device in one of the figures is turned over, elements described as "below" or "beneath" other elements would then be oriented "above" the other elements. The terms of "below" or "beneath" can therefore encompass both an orientation of above and below.

Figure 1:
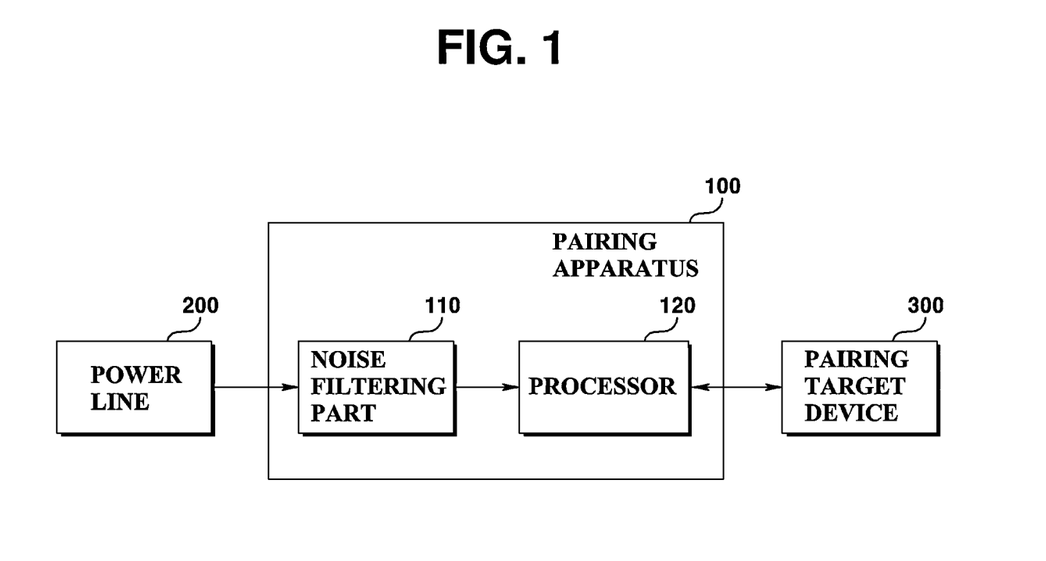
FIG. 1 is a block diagram of a pairing apparatus according to an exemplary embodiment of the present invention.

FIG. 1 is a block diagram of a pairing apparatus according to an exemplary embodiment of the present invention.

Figure 5:
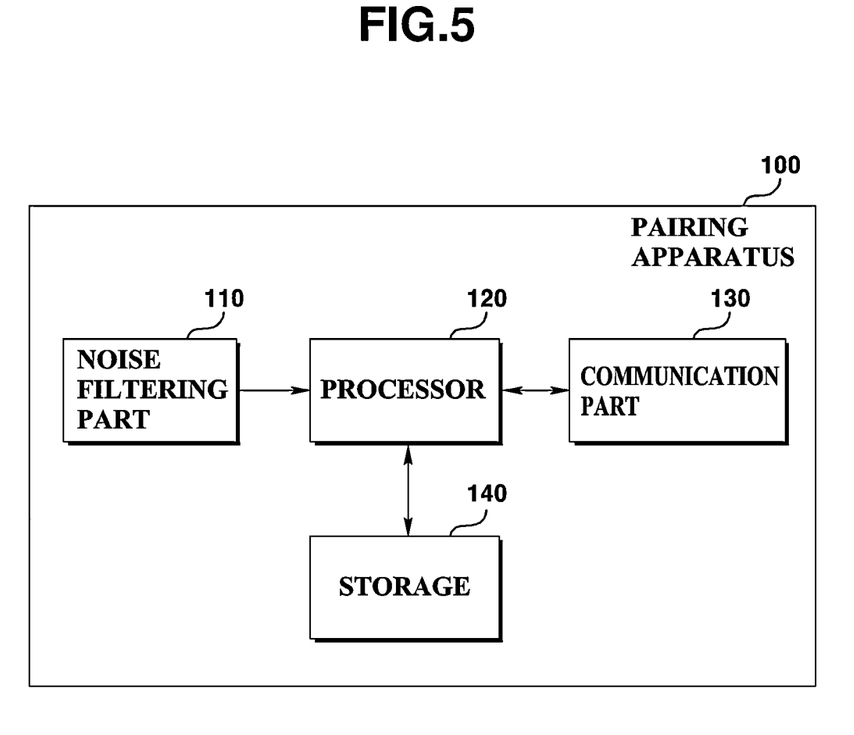
FIG. 5 is a block diagram of a pairing apparatus according to another exemplary embodiment of the present invention.

The pairing apparatus (100) according to an exemplary embodiment of the present invention may include a noise filtering part (110) and a processor (120), and may further include a communication part (130) and storage (140), as shown in FIG. 5.

The noise filtering part (110) may filter noises in a power line (200).

To be more specific, the noise filtering part (110) may filter noises included in the power line (200). In generating a secret key for pairing and authentication, noises included in the power line (200) are used. The noises included in the power line (200) are signals corresponding to noises except for a fundamental frequency included in the power line, and noises are included in each power line, and, a secret key may be generated for pairing and authentication of devices using the same power line by using the fact that each power outlet connected to one power line has a predetermined type of noise. The noises included in a power line may have randomness, and may be similar within a geographically close outlet groups, but may be mutually different when a distance is remote or when mutually different power lines are used. Security can be increased by generating a secret key using thus mentioned power line noise characteristics.

Figure 2:
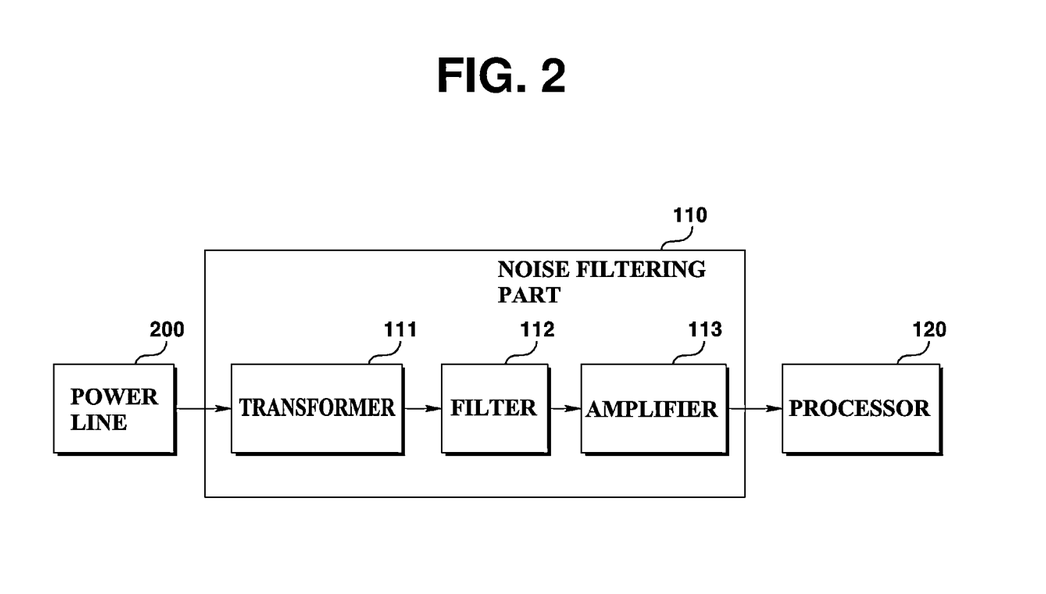
FIG. 2 is a block diagram of a noise filtering part of a pairing apparatus according to an exemplary embodiment of the present invention.

The noise filtering part (110) may extract only a signal corresponding to a noise among signals in the power line (200). The noise may be filtered by removing a fundamental frequency element included in the power line (200). The noise filtering part (110) may include a transformer (111), a filter (112) and an amplifier (113) in order to filter the noise, as shown in FIG. 2.

The transformer (111) may transform a voltage of power line (200) to a first voltage.

To be more specific, a voltage of the power line (200) may differ from the first voltage processible by the pairing apparatus (100), and may be converted to match to the pairing apparatus (100). Here, the first voltage may be a rated voltage of the pairing apparatus (100), and may be so set as to protect an internal circuit of the pairing apparatus (100).

The transformer (111) may lower the voltage of power line to a voltage processible by the pairing apparatus (100), and a circuit in the pairing apparatus (100) may be separated from that of the power line (200). Toward this end, the transformer (111) may be a split-core transformer. One coil in the two secondary coils may supply a power necessary for the device, and a remaining one coil in the two secondary coils may be used to filter the noises. Through this process, the power supply and the noise filtering are divided to increase accuracy of noise filtering. The transformer (111) may be an insulation transformer, or may be a transformer of different types.

Figure 3:
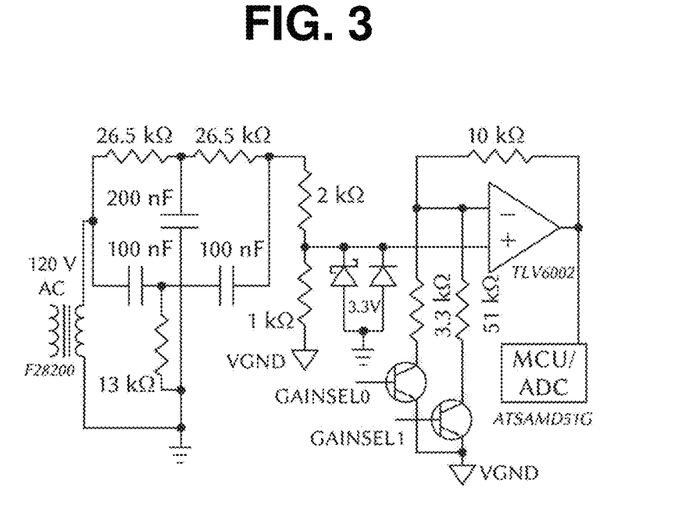
FIGS. 3 and 4 are drawings for explaining a noise filtering part.

FIG. 3 illustrates an exemplary embodiment of a circuit of the noise filtering part (110), where a transformer may be formed at a front end of the noise filtering part (100). The transformer (111) may transform a 120 V AC power signal to a lower voltage. The filter (112) may attenuate a fundamental frequency band of a signal converted to the first voltage.

Figure 4:
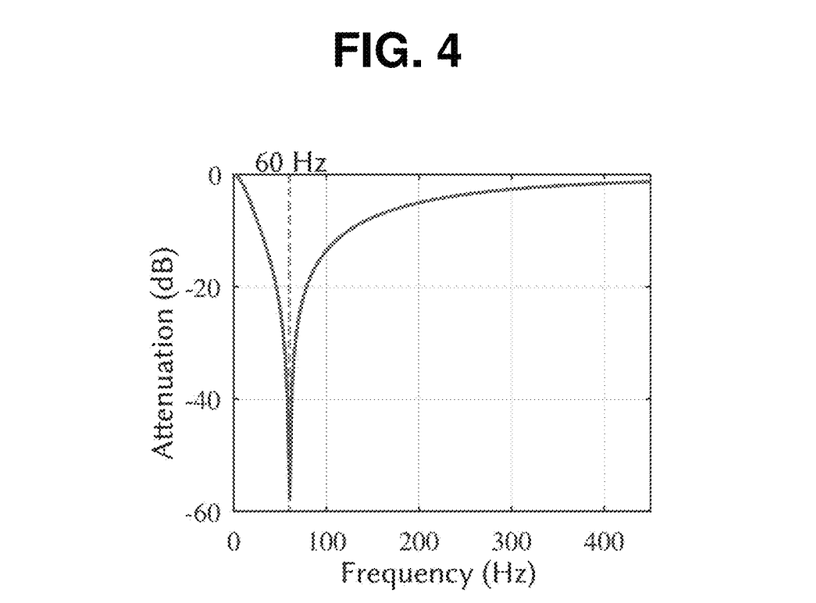

To be more specific, the filter (112) is used in order to attenuate a fundamental frequency band of a signal that has converted to the first voltage through the transformer (111), because only noises are used in the signal of power line. A attenuating (cut-off) filter may be used in order to attenuate a particular frequency band. For example, a twin-T notch filter may be utilized, as illustrated in FIG. 3. Other attenuating filters may be used in addition to the twin-T notch filter. The power line may use 60 Hz as a fundamental frequency, and a signal of the fundamental frequency band may be unnecessary for generating a secret key. A signal of a relevant frequency band may transmit an almost identically repeated signal for each cycle that may constitute an obstacle in extracting an intrinsic pattern and that may attenuate a band including 60 Hz as shown in FIG. 4. It should be apparent that a band attenuated in response to a fundamental frequency of power line may become different. The SNR (Signal to Noise Ratio) may be increased through the interruption of fundamental frequency band.

The amplifier (113) may amplify a voltage of a signal attenuated in the fundamental frequency band to within a predetermined period.

To be more specific, a signal interrupted in the fundamental frequency band may be substantially reduced in magnitude (amplitude) of signal corresponding to noise, and may be amplified to a size adequate enough to extract a size of a signal corresponding to the noise using a secret key. For example, an amplitude of a signal having passed a notch filter formed as shown in FIG. 3 may be 200 mV-300 mV, and an average value thereof may be 0 V. A scope of amplitude may be so arranged as to be 0 V~3.3 V by shifting and amplifying a relevant signal. A diode formed at an end of filter may clip a waveform of filtering signal between 0 V~3.3 V to thereby prevent the amplifier (113), the processor (120) and others from being damaged.

The amplifier (113) may change a gain of the amplifier in response to amplitude of a signal attenuated in the fundamental frequency band. In amplifying a signal through the amplifier (113), the amplified signal may still be decreased or greatly increased in response to the size of noise. When the size of noise is too small to be processed, a measurement result may not be accurate due to sensitivity to errors. Conversely, when the size of noise is too great, information may be lost because a large portion may be clipped off by diodes. As a result, a gain of amplifier (113 may be adaptively changed in response to the size of noise. For example, as shown in FIG. 3, a BJT transistor may be formed on a feedback loop between an inverted input of operational amplifier (op-amp) and ground (VGND), and a gain of op-amp may be controlled by reconciling at least one signal of GAINSEL0 or GAINSEL0 of transistor. As noted, the noise filtered by the noise filtering part (110) may be applied to the processor (120).

The processor (120) may generate a secret key using the filtered noise, and perform the pairing and authentication with the pairing target device using the generated secret key.

To be more specific, the processor (120) may generate a secret key using the noise filtered by the noise filtering part (110). The secret key is a secret key used for performing a pairing and authentication with the pairing target device (300), and is generated by using a noise included in a power line to thereby enhance the security. Subsequent to the generation of secret key, data transmission/receipt can be performed with the pairing target device (300).

The processor (120) may be a MCU (Micro Controller Unit) and may be formed with 32 bits executed at 120 MHz by on chip ADC capable of providing a sampling rate of maximum 1 MSPS with 12 bit resolution. The processor (120) ma further include a communication part (130) useable for transmitting a secret key to a host through an imaginary COM port (serial) interface. Here, the communication part (130) may include a USB port.

The processor (120) may perform the following processes in order to generate a secret key using the filtered noise.

The processor (120) may extract a bit sequence by sampling the filtered noise while generating the secret key through synchronization with the pairing target device and performing the authentication using the secret key. The processor (120) may extract the bit sequence by sampling the filtered noise through an intrinsic pattern while generating mutually same bit sequences through synchronization with the pairing target device, from where the secret key can be generated. Thereafter, the authentication may be performed using the generated secret key.

To be more specified, the processor (120) may perform the sampling of the filtered noise, transmit a sampling rate to the pairing target device and receive the sampling rate from the pairing target device to synchronize the sampling rate and the sampling time, extract a bit sequence by comparing a maximum absolute value with an average value for each period of the sampled noise, transmit an error correcting code of the extracted bit sequence to and receive the error correcting code from the pairing target device, and generate the secret key by reconciliation of the extracted bit sequence.

Hereinafter, each process will be explained with reference to FIGS. 6 and 7. Each of the pairing apparatus (100) and the pairing target device (300) is a device that mutually performs the pairing and authentication, and for example, as illustrated in FIG. 7, the pairing apparatus (100) may be a WiFi access point, i.e., a router, and the pairing target device (300) may be an IoT device like a video camera.

In order to execute the pairing and authentication processes, each device (100, 300) may perform a noise sampling (S1). Prior to the noise sampling process, a connected initialization step may be also performed. Each device (100, 300) may independently perform the noise sampling, where the sampling time and sampling rate may be mutually different. The sampling time and sampling rate may become different due to intrinsic own temperature and other factors of the processor (120), and therefore, the sampling time and the sampling rate must be matched. That is, a process of mutually matching the sampling rate and the sampling time is required.

To this end, each device (100, 300) may measure the sampling rate (S2). The sampling rate may be measured by the number of samples for each period. The period of the sampling rate may be 60 Hz. When the sampling is performed, several periods may be first sampled using an approximate sampling frequency r and an approximate sampling rate c. Here, the sampling rate c may be the number of samples for each period. A measured signal Su may be equally divided by sequence of length c. Here, a first sequence may be called a sequence preamble period (preamble period). Ideally, an average value for each index of a signal equally divided due to 60 Hz sine wave characteristic of power line, when c is an accurate sampling rate, may show a high correlation compared with a preamble period. Thus, each device (100, 300) may sweep the c value near r/60 using repetitive methods in order to seek for an accurate sampling rate that shows a highest correlation between an index method average slice and preamble period.

FIG. 5 is a graph showing a comparative example among 20 follow-up periods relative to preamble period, c=1416, 1419, and 1422, where it can be ascertained that the correlation with the preamble period is highest at where the slice length c=1419 among three average slices, and "c=1419" may be measured as a sampling rate. Each device (100, 300) may measure a sampling rate through the above-mentioned processes. Each device (100, 300) may mutually transmit and receive $c_A$ and $c_B$ (S3) using sampling results at (100, 300) respectively as $S_A$ and $S_B$, and sampling rates as $c_A$ and $c_B$.

Thereafter, each device (100, 300) having received each sampling rate may mutually match the sampling rates (S4). That is, the number of samplings for each period is matched. At this time, a smaller value may be established as a sampling rate in between the mutual sampling rates. That is, noise may be sampled again using the smaller value in between $c_A$ and $C_B$.

The sampling times may be synchronized after the sampling rates are matched. To this end, the pairing apparatus (100) may first transmit the sampled noise sample to the pairing target device (300) (S5), and the pairing target device (300) may synchronize the sampling times using the received noise sample (S6). Here, the noise sample may transmit a snippet of the sampled noise to a part of the sampled noise.

Figure 6:
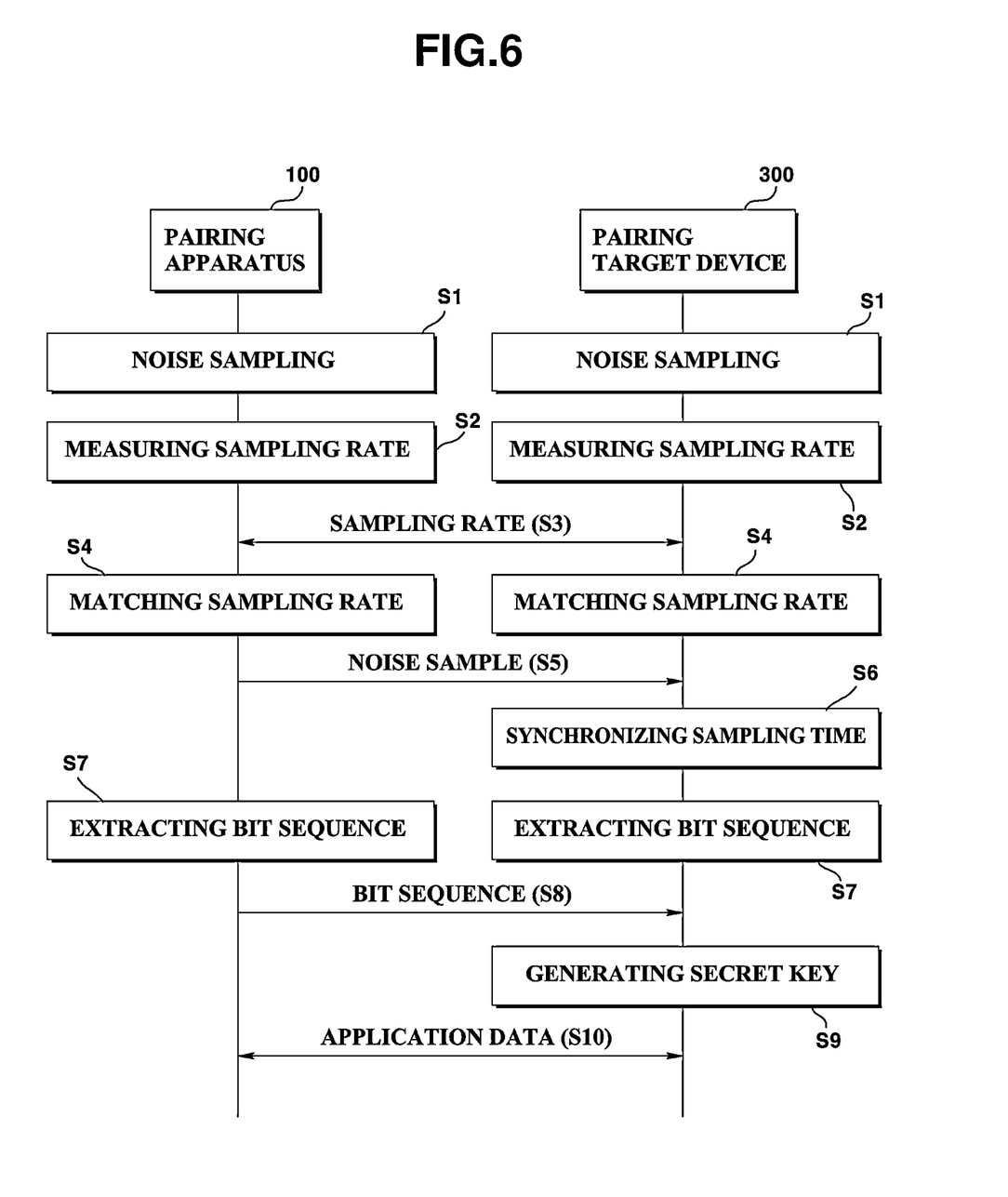
FIGS. 6 to 11 are drawings for explaining a process of generating a secret key using a pairing apparatus according to an exemplary embodiment of the present invention.
Figure 7:
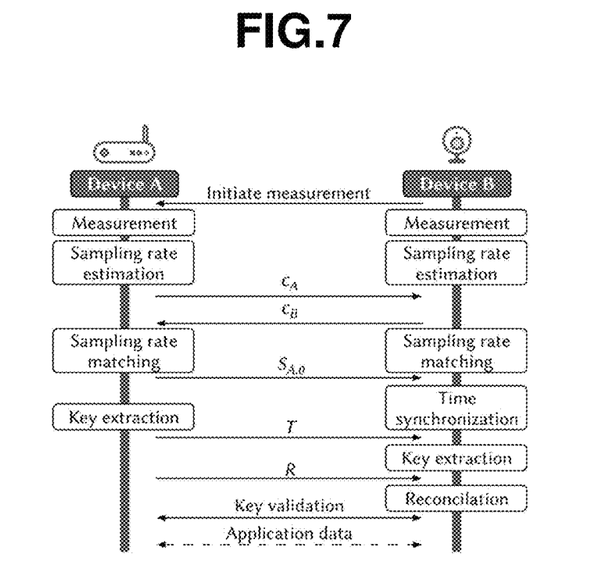

Although the sampling rates of two devices may be corresponded when the sampling rates are matched, two signals $S_A$ and $S_B$, which are the sampling results of two devices, may generate an error on time alignment due to offset of d-numbered samples caused by network latency during data transmission, as shown in FIG. 6.

That is, each device (100, 300) cannot start the sampling simultaneously. For example, a waiting time of the maximum number ms on a WiFi (Wireless Fidelity) network is common, which however may cause a great influence in consideration of the length (16.7 ms) of single cycle. Particularly, time synchronization is essential in a low-cost IoT because no elements to realize accurate time synchronization are available as in the GPS and atomic clock. Toward this end, first of all, the pairing apparatus (100) may transmit the preamble periods $S_{A,0}$ having ci sample period to the pairing target device (300), and may seek an offset d generating a highest correlation at $S_B$ which is a subsequent period using the preamble period received by the pairing target device (300) in response to a sliding window. In order to prevent information from being leaked in the data transmission/receipt, the preamble period may be used only for time synchronization, and may not be used for bit sequence extraction. Thus, samples up to the end of the preamble periods are removed by both devices (100, 300). As a synchronization process between two devices (100, 300) in FIG. 6, because after d sample is removed, $S_A$ and $S_B$ can be accurately aligned to a common time standard, division (separation) may be made to the synchronized periods $S_{A,p}$ and $S_{B,p}$. Here, p may be a period number (p=0, 1, 2, $n_p$).

Subsequent to synchronization of sampling time, each device (100, 300) may extract a bit sequence from the sampled noise (S7). The bit sequence may be extracted which is a sequence formed with a bit value, using a signal characteristic of sampled noise. To this end, the sampled noise may be divided by a predetermined period, where 1 bit value may be extracted when a value having a maximum absolute value for each period is greater than an entire average value of the sampled noises, and 0 (zero) bit value may be extracted when a value having a maximum absolute value for each period is smaller than an entire average value of the sampled noises, thereby extracting the bit sequence. The pairing target device (300) may extract a bit sequence using timestamp generated when the pairing apparatus (100) extracts the bit sequence.

The noise period $N_{u,p}$ may be expressed as noise constituent element existing on each period, which may be a random variability for each period, and which may show a difference between indexes of two continuous periods. The noise period $N_{u,p}$ may be defined by the following equation.

$$N_{u,p} = S_{u,p} - S_{u,p+1} = 1 \qquad \text{Equation 1}$$

The preamble period $S_{u,0}$ may be exposed to outside during time synchronization process, and may not be used in the bit sequence extraction. Each noise period for extracting several bits may be uniformly and equally divided by $n_b$ bin, and each bin may be included with a sample of maximum integer less than $c_i/n_b$. First of all, the pairing apparatus (100) may extract an index of sample having a maximum absolute value from all samples for each period. A relevant value may be expressed as $T_{p,b}$, where b=1, 2, ... $n_b$, meaning a bin number. Thereafter, a sequence T of index may be transmitted to the pairing target device (300). When a common index sequence T of the pairing apparatus (100) is utilized, each of the two devices (100, 300) may extract a noise $N_{u,p}(T_{p,b})$ value from each index $T_{p,b}$ whereby a same bit sequence may be extracted. When $N_{u,p}(T_{p,b})$ is greater than an average of the noise period, the bit 1 may be extracted from b th bin of p th period, and if negative, bit 0 may be extracted. That is, where p=1, 2, ..., $n_p$ and b=1, 2, ..., $n_b$, bit $K_{u,p,b}$ may be expressed as under.

$$K_{u,p,b} = \begin{cases} 1, & \text{if } N_{u,p}(T_{p,b}) \geq \text{mean}(N_{u,p}) \\ 0, & \text{if } N_{u,p}(T_{p,b}) < \text{mean}(N_{u,p}) \end{cases} \qquad \text{Equation 2}$$

FIG. 7 illustrates an example of bit sequence extraction process, where subsequent to sampling rate operation and time synchronization process, periods of two noises independently obtained from each device (100, 300) may have a high correlation. Where equal division (e.g., $n_b$=7) is made to 7 bins, the index T=($T_{p,1}$, $T_{p,2}$, ..., $T_{p,7}$) of maximum absolute value within each bin may be transmitted to the pairing target device (300), and when a value in a relevant index of pairing target device (300) exceeds an average of noise period, the bit may be converted to bit 1 (b=1, 2, 5 and 7), and when the value is smaller than the average, the bit may be transformed to bit 0 (b=1, 3, 4 and 6). Even if $T_{p,b}$ is leaked through hacking, there is no knowing of resultant bit sequence K when there is no noise period sampled from the power line.

At this time, because amplitude of relative minimum value and maximum value of a signal is extracted, there is less likelihood of signal misalignment being generated, and even in the case of synchronization between two devices (100, 300) being of less perfect, a bit unit error in the resultant bit sequence becomes to be decreased.

Successively, the pairing apparatus (100) may transmit an error correcting code of extracted bit sequence to the pairing target device (300) (S8). Here, the error correcting code of the extracted bit sequence may be an error correcting code. The pairing apparatus (100) may also transmit by encoding the extracted bit sequence. Thereafter, the pairing target device (300) may generate a secret key (S9) by reconciliation of the bit sequence using the received error correcting code of bit sequence at the pairing apparatus (100) and self-extracted bit sequence.

Although a bit sequence may be generated through the aforementioned processes, bits of bit sequence must be accurately matched to allow the bit sequence to be used for authentication or encryption of the bit sequence. An indecipherable encoded message may be generated even when a single bit difference exists between two independently generated bit sequences. That is, when a single bit error is generated from the extracted bit sequence by a small difference of noise pattern, a secret key cannot be used for the purpose of authentication or encryption. Thus, bit error must be foremost solved in order for the extracted bit sequence to be used for authentication or encryption, and toward this end, a process of reconciliation of bit sequence must be performed. The reconciliation is a process of generating a secret key from two similar bit sequences capable of allowing a pair of remote devices to have a small-percentaged bit error, where the reconciliation of bit sequence is largely based on ECC (Error correcting code). For example, (n,k) ECC can reduce n bit entropy as much as n-k bit based on a total of 2k enabled code word of n bit sequence.

Figure 8:
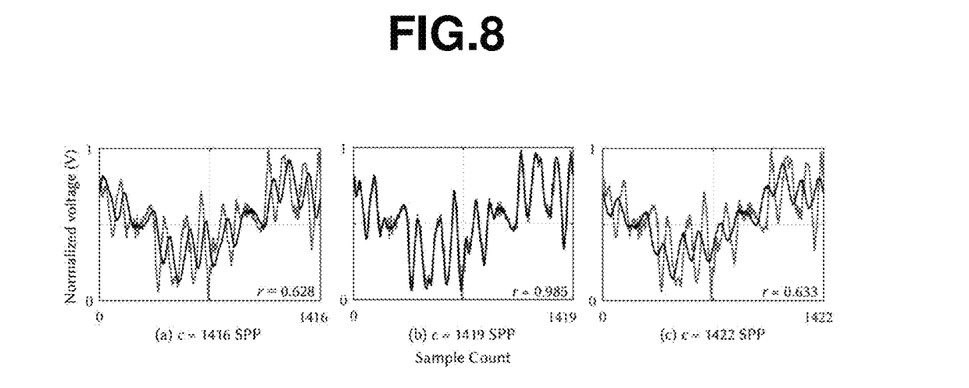
Figure 9:
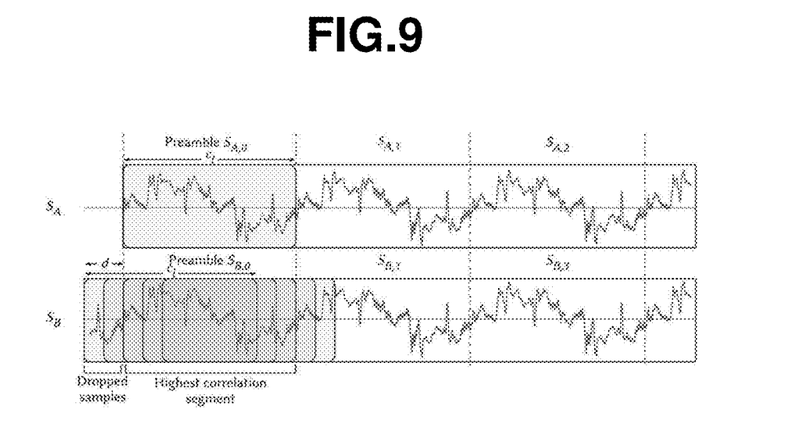
Figure 10:
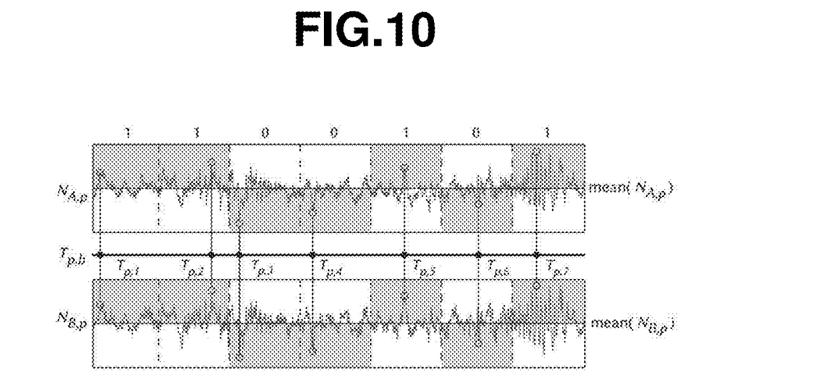
Figure 11:
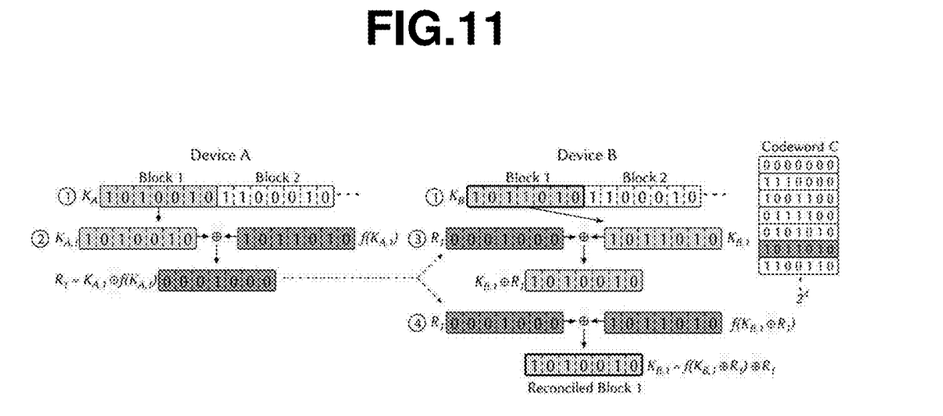

FIG. 8 shows a quantization-based forming process using Hamming (7,4) code. Two devices may use a public codeword C set formed with possible 7 bit sequence of public 16 bit($2^k$). f(b) (here, b is a block number) means a publicly useable function capable of mapping 7 bit sequence extracted in relation to the nearest hamming distance to codeword of C.

First of all, each device (100, 300) may extract sequential blocks of 7 bit sequence from the extracted bit sequence (expressed as $K_A$ and $K_B$). The pairing apparatus (100) may perform "$R_b = K_{A,b} \oplus f(K_{A,b})$". The said bit is a 7 bit sequence, and each bit may encode whether there is a difference between maps of extracted bit sequence $K_{A,b}$ and C, and may transmit a resultant $R_b$ to the pairing target device (300). Successively, the pairing target device (300) may reverse the bit difference using the own 7 bit sequence $K_{B,b}$ and $R_b$. When f(b) is used, a result of prior step may be mapped on the codeword, and another bit flip operation may be performed using thus-obtained codeword $R_b$, from which a high probability $K_{A,b}$ can be obtained. A reconciliated key cannot be extracted absent information on n bit codeword, without the extracted bit sequence $K_A$ or $K_B$ even if $R_b$ is leaked through hacking. Because C has 16 types of probabilities, the entropy may boil down to 4 bit as a result of each block.

It should be apparent that other ECCs may be applied, and two mutually different hamming code sets {e.g., Hamming (3,1) and Hamming (7,4)} may be used as mapping function between n bit and k bit codewords. At this time, error may be corrected through reconciliation on an arbitrary bit sequence, where the number of bit errors correctible through reconciliation may be limited. In order to ensure stability and security, the security may be reconciled by controlling n and k.

Thereafter, authentication and encryption may be performed using a finally generated secret key, and certified inter-device encoded application data may be transmitted and received (S10).

A secret key may be periodically updated. Toward this end, a process of generating a secret key may be periodically repeated. Alternatively, a process of generating a secret key may be performed whenever pairing is required on a new device, or a process of generating a secret key may be also conducted when data transmission rate resultant from pairing decreases below a threshold, or when there is a command inputted by a user.

Although examples in the aforesaid explanations have been provided about the pairing apparatus (100) transmitting noise samples, bit sequences, time stamps or encoded bit sequences to the pairing target device (300), or the pairing target device (300) synchronizing the sampling time or generating a secret key, a subject of each process may be realized from mutually different devices.

As elaborated above, pairing and authentication may be realized without a user intervention by generating a secret key using noise on a power line. The security can be maintained even if data is leaked during data transmission/reception processes, and accuracy can be enhanced through bit reconciliation. The pairing and authentication may be realized even in low-priced, low-specification devices through less complicated processes, and pairing having a high security and stability may be also possible.

An electronic device according to an exemplary embodiment of the present invention may include a pairing module corresponding to the pairing apparatus according to the aforementioned exemplary embodiments of the present invention. The pairing module may be formed on a power supplier from which the electric device receives an electric power, or a USB charger. Alternatively, the pairing and authentication with other devices may be performed by attaching an external pairing apparatus thereto.

Detailed explanations on each step of FIGS. 12, 13, 14 and 15 correspond to those of the pairing apparatus in FIGS. 1 to 12, and therefore, redundant explanations will be omitted hereinafter.

Figure 12:
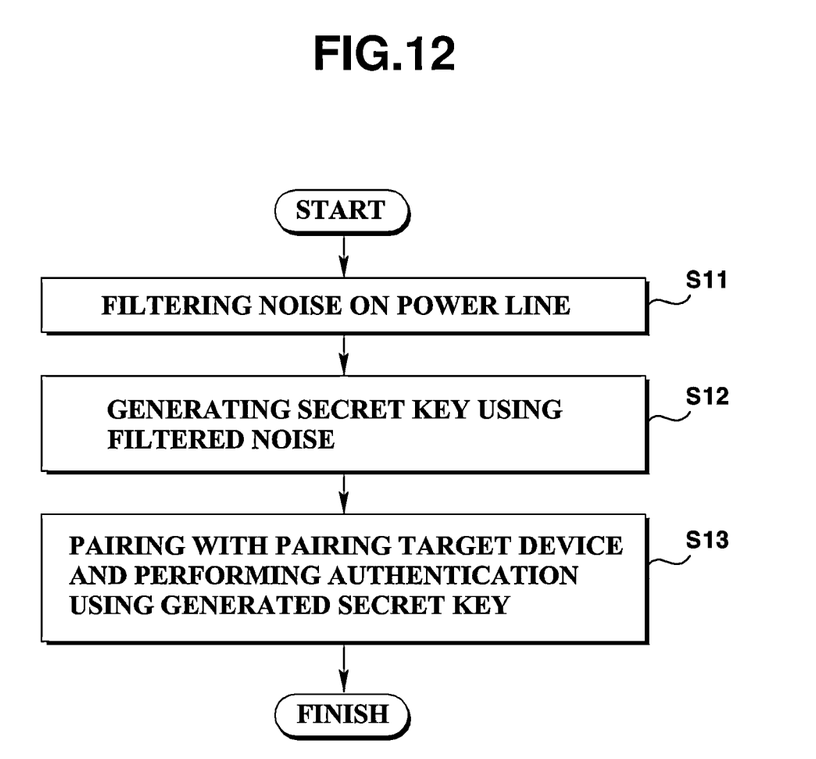
FIG. 12 is a flow chart of a pairing method according to an exemplary embodiment of the present invention.

A pairing method performing a pairing with a pairing target device may be initially performed by filtering noises on a power line at Step 11.

Figure 13:
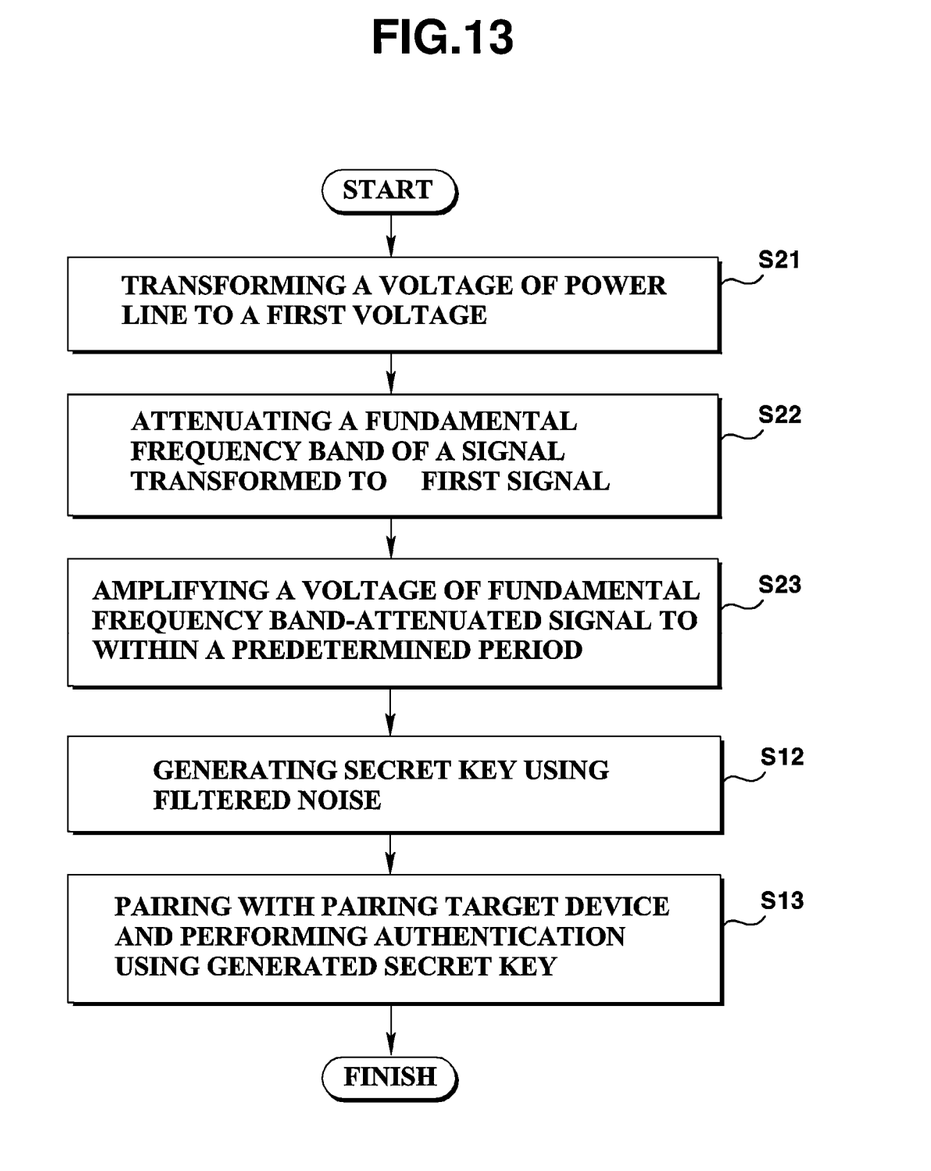
FIGS. 13, 14 and 15 are flow charts of a pairing method according to another exemplary embodiment of the present invention.

The steps of filtering noises on a power line may be carried out through Steps S21 to S23. First of all, a voltage on the power line may be converted to a first voltage at S21, a fundamental frequency band of a signal converted to the first voltage may be attenuated at S22, and a voltage of the signal attenuated in the fundamental frequency band may be amplified to within a predetermined period at S23. When the voltage of the signal attenuated in the fundamental frequency band is amplified to within a predetermined period, a gain of an amplifier may be changed in response to amplitude of the signal attenuated in the fundamental frequency band.

Successively, a secret key may be generated using the noises filtered at S12.

Figure 14:
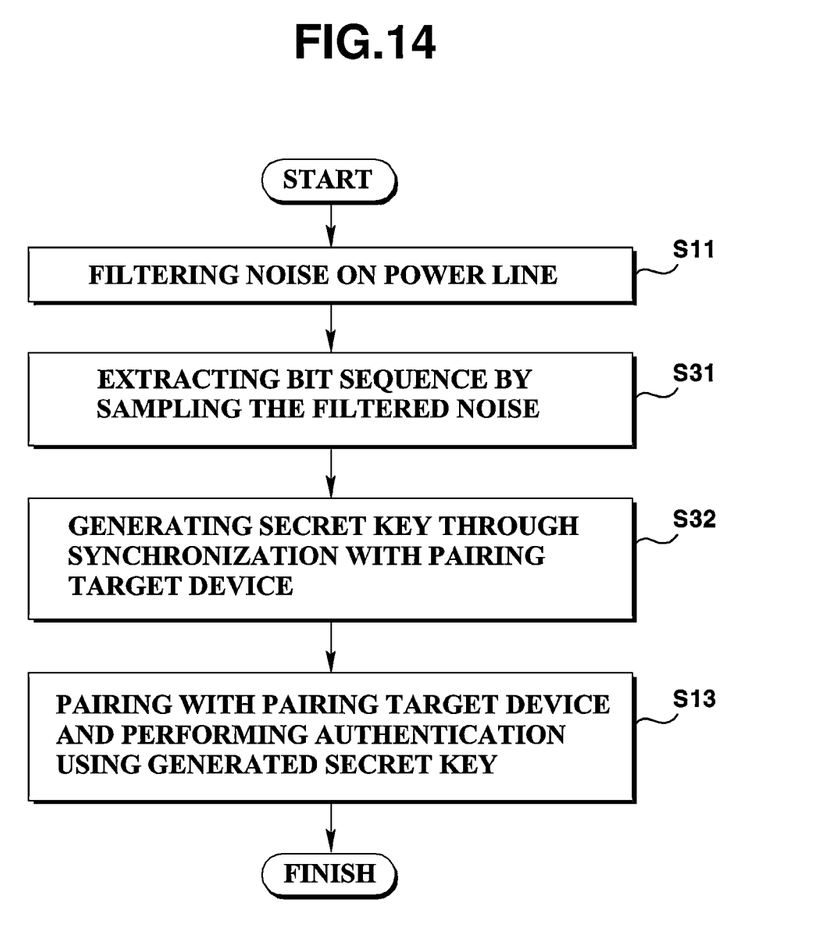

The step of generating a secret key may be performed through Steps S31 and S32.

First of all, the filtered noises may be sampled to extract a bit sequence at S31, and the secret key may be generated through synchronization with the pairing target device at S32.

Figure 15:
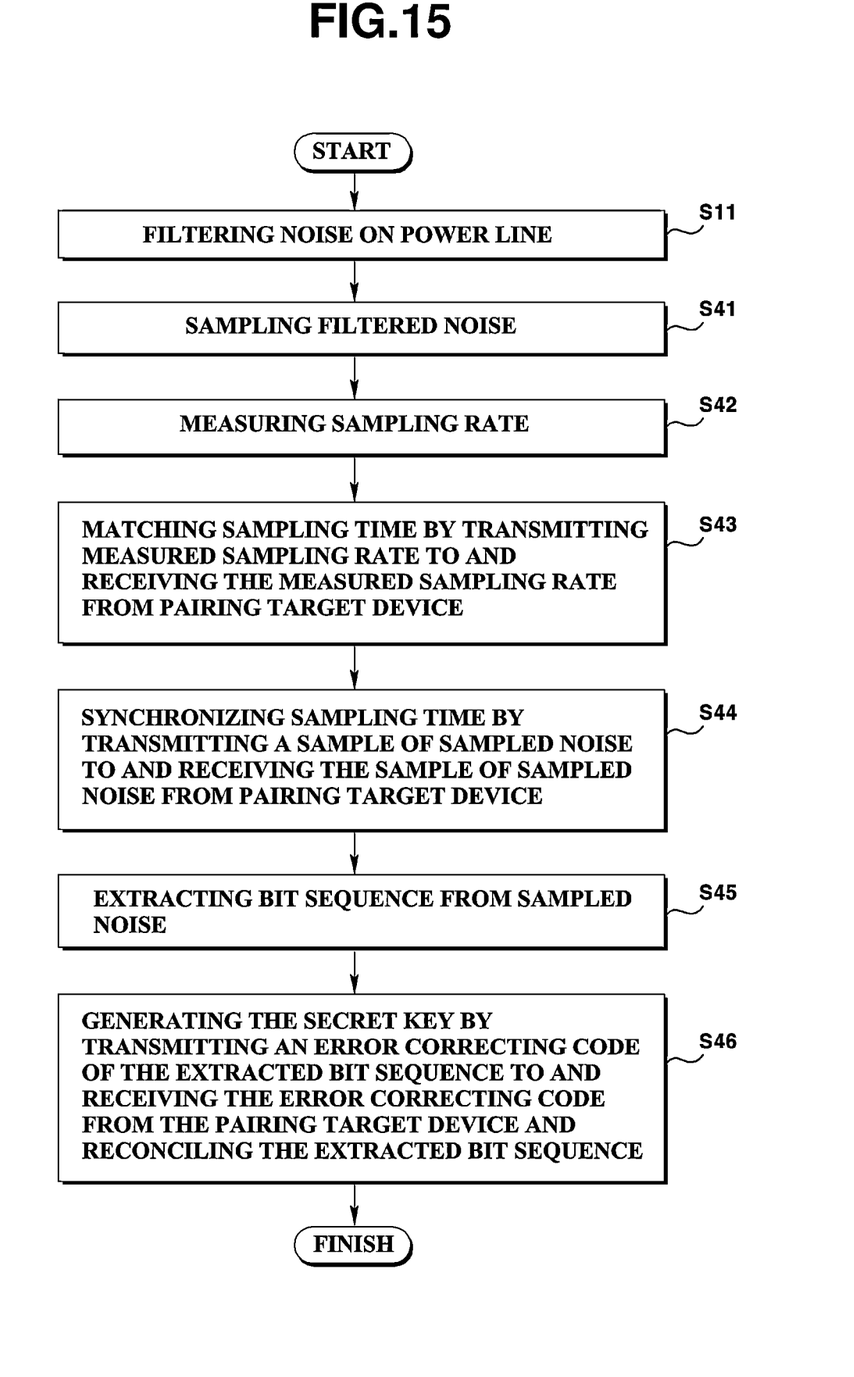

The steps of generating a secret key may be carried out from S41 to S45. First of all, the filtered noises may be sampled at S41, sampling rates may be measured at S42, the measured sampling rates may be transmitted to and received from the pairing target device to thereby match the sampling rates at S43, the sampled noise samples may be transmitted to and received from the pairing target device to thereby synchronize the sampling times at S44, and bit sequences may be extracted from the sampled noises at S45.

The step S45 that extracts the bit sequences may be performed by a step where the sampled noises are divided to a predetermined period, and by a step where 1 bit value is extracted when a value having a maximum absolute value for each period is greater than an entire average value of sampled noises, and 1 (zero) bit value is extracted when a value having a maximum absolute value for each period is smaller than an entire average value of sampled noises to thereby extract the bit sequences.

The bit sequences may be extracted, and an error correcting code of the extracted bit sequence may be transmitted to and received from the pairing target device and the secret key may be generated by conciliating the extracted bit sequence at S46.

Thereafter, the pairing and authentication are performed with the pairing target device using the secret key generated in the S13.

Meantime, the exemplary embodiments of the present invention may be realized in a code readable by a computer on a recording medium. The recording medium readable by a computer may include all types of recording devices stored with data readable by a computer system. Examples of recording medium readable by a computer may include a ROM, a RAM, a CD-ROM, a magnetic tape, a floppy disk, an optical data storage, and furthermore, the recording medium readable by a computer may be dispersed onto a computer system connected via network where codes readable by the computer by way of dispersion method may be stored and executed. In addition, functional programs, codes and code segments for realizing the present invention may be easily inferred by programmers of technical fields belonging to the present invention.

It will be apparent to those skilled in the art that exemplary embodiments may be embodied in many different forms within a scope not deviating from the essential characteristics of the present invention. Therefore, the hitherto-described methods should be considered not in a limiting aspect but in an explanatory aspect. The scope of the present invention is not intended to be limited by the foregoing descriptions, but rather defined by claims set out below, and it should be interpreted that all differences within the equivalent scopes are included in the present invention.

What is claimed is:

1. A pairing apparatus, comprising:
a noise filtering part for filtering a noise on a power line; and
a processor for generating a secret key using the filtered noise and for performing a pairing and an authentication with a pairing target device using the generated secret key;
wherein the processor samples the filtered noise, synchronizes a sampling rate and a sampling time by transmitting the sampling rate to and receiving the sampling rate from the pairing target device, extracts a bit sequence by comparing a maximum absolute value and an average value of each period of the sampled noise, transmits an error correcting code of the extracted bit sequence to and receiving the error correcting code of the extracted bit sequence from the pairing target device, and generates the secret key by reconciling the extracted bit sequence.

2. The pairing apparatus of claim 1, wherein the noise filtering part includes:
a transformer for transforming a voltage of the power line to a first voltage;
a filter for attenuating a fundamental frequency band of a signal transformed to the first voltage; and
an amplifier for amplifying the signal attenuated in the fundamental frequency band to within a predetermined period.

3. The pairing apparatus of claim 2, wherein the amplifier changes a gain of the amplifier in response to an amplitude of the signal attenuated in the fundamental frequency band.

4. The pairing apparatus of claim 1, wherein the processor extracts a bit sequence by sampling the filtered noise while generating the secret key through synchronization with the pairing target device and performing the authentication using the secret key.

5. A pairing method, comprising:
filtering a noise in a power line;
generating a secret key by using the filtered noise; and
performing a pairing and an authentication with a pairing target device using the generated secret key;
wherein a processor samples the filtered noise, synchronizes a sampling rate and a sampling time by transmitting the sampling rate to and receiving the sampling rate from the pairing target device, extracts a bit sequence by comparing a maximum absolute value and an average value of each period of the sampled noise, transmits an error correcting code of the extracted bit sequence to and receiving the error correcting code of the extracted bit sequence from the pairing target device, and generates the secret key by reconciling the extracted bit sequence.

6. The pairing method of claim 5, wherein the step of filtering the noise of the power line comprises:
transforming a voltage of the power line to a first voltage;
attenuating a fundamental frequency band of a signal transformed to the first voltage; and
amplifying the signal attenuated in the fundamental frequency band to within a predetermined period.

7. The pairing method of claim 6, wherein the amplifying step includes changing a gain of the amplifier in response to an amplitude of the signal attenuated in the fundamental frequency band.

8. The pairing method of claim 5, wherein the step of generating the secret key includes:
extracting a bit sequence by sampling the filtered noise; and
generating the secret key through synchronization with the pairing target device.

9. The pairing method of claim 5, wherein the step of generating the secret key includes:
sampling the filtered noise;
measuring a sampling rate;
matching the sampling rate by transmitting the measured sampling rate to and receiving the measured sampling rate from the pairing target device;
synchronizing the sampling time by transmitting a sample of the sampled noise to and receiving the sample of the sampled noise from the pairing target device;
extracting a bit sequence from the sampled noise; and
generating the secret key by transmitting an error correcting code of the extracted bit sequence to, receiving the error correcting code of the extracted bit sequence from the pairing target device, and reconciling the extracted bit sequence.

10. The pairing method of claim 9, wherein the step of extracting the bit sequence includes:

dividing the sampled noise by a predetermined period; and extracting the bit sequence by extracting a one (1) bit value when a value having a maximum absolute value for each period is greater than an entire average value of the sampled noise, and extracting a zero (0) bit value when a value having a maximum absolute value for each period is smaller than an entire average value of the sampled noise.

11. A non-transitory computer-readable recording medium containing a program for executing a method, comprising:

filtering a noise in a power line;

generating a secret key by using the filtered noise; and performing a pairing and an authentication with a pairing target device using the generated secret key;

wherein a processor samples the filtered noise, synchronizes a sampling rate and a sampling time by transmitting the sampling rate to and receiving the sampling rate from the pairing target device, extracts a bit sequence by comparing a maximum absolute value and an average value of each period of the sampled noise, transmits an error correcting code of the extracted bit sequence to and receiving the error correcting code of the extracted bit sequence from the pairing target device, and generates the secret key by reconciling the extracted bit sequence.

* * * * *